J. SUMMERS.
PILOT OR FENDER.
APPLICATION FILED MAR. 29, 1912.

1,089,287.

Patented Mar. 3, 1914.

Witnesses
Carroll Bailey
E. Edmonston Jr.

Inventor
John Summers,
By Victor J. Evans
Attorney

COLUMBIA PLANOGRAPH CO., WASHINGTON, D. C.

UNITED STATES PATENT OFFICE.

JOHN SUMMERS, OF MAYBROOK, NEW YORK.

PILOT OR FENDER.

1,089,287.  Specification of Letters Patent.  Patented Mar. 3, 1914.

Application filed March 29, 1912. Serial No. 687,132.

*To all whom it may concern:*

Be it known that I, JOHN SUMMERS, citizen of the United States, residing at Maybrook, in the county of Orange and State of New York, have invented new and useful Improvements in Pilots or Fenders, of which the following is a specification.

This invention relates to pilots or fenders and one of the principal objects of the invention is to provide a simple and efficient, inexpensive device which may be conveniently attached to an automobile or a like vehicle so that dogs or other animals or pedestrians when struck will be thrown to one side.

A further object of the invention is the provision of a fender or pilot adapted to be secured on the automobile axle and to the body of the car and to accommodate itself to all variations in the relative positions of the body and axle.

Further objects of this invention will appear as the following specific description is read in connection with the accompanying drawing, which forms a part of this application, and in which:—

Figure 1:
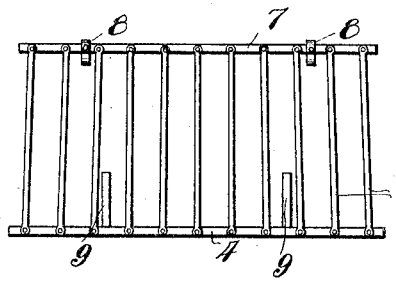
Figure 2:
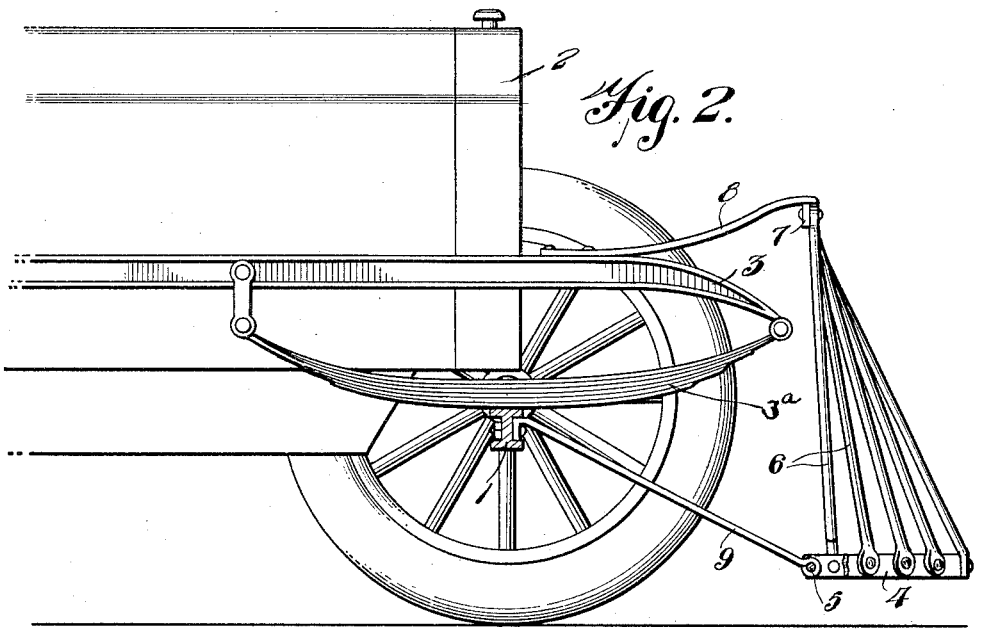
Figure 3:
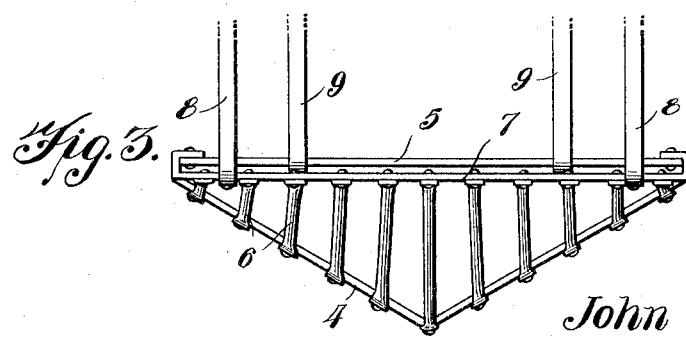

Figure 1 is a front elevation of the device on a scale about half that of Figs. 2 and 3. Fig. 2 is a side elevation showing the fender applied to a vehicle axle and vehicle body. Fig. 3 is a top plan view of the fender.

For the purpose of this specification, the front portion of an automobile is shown in Fig. 2 of the drawings, the front axle being indicated at 1, the body at 2, one of the side bars of the chassis at 3, and one of the front springs at 3ª, the said spring having its ends flexibly connected, as usual, to the side bar of the chassis.

My improved fender is arranged in front of the automobile and has a lower substantially V-shaped bar 4 whose ends are connected together by a separate bar 5 which braces and reinforces the structure and holds the V-shaped bar in shape and position. This V-shaped bar is connected by a series of upright spaced bars 6 to a straight upper bar 7. In practice the bars 6 may be in the form of tubes having flattened ends, the lower ends of the said tubes or bars being secured to the bar 4 and their upper ends being secured to the bar 7. Supporting arms 8 which are pivotally curved, as shown, have their front ends secured to the top bar 7 at points near the ends of said top bar and have their rear ends secured directly on the side bars of the chassis at points some distance from the front ends of said side bars by means of bolts that admit of the ready removal of the said supporting arms from said side bars.

The lower brace bar 5 is secured to the front axle by means of arms 9, the front ends of the said arms being pivotally connected to the said lower brace bar and their rear ends being secured as by means of bolts rigidly and directly to the front axle.

The pivotal connection between the brace bar and the supporting arms 9 and the elasticity of the upper supporting arms 8 permit the fender to accommodate itself to the difference in relative position between the axle and the side bars of the chassis, occasioned by the action of the springs.

What I claim as new is:—

In combination with the front axle, chassis side bars and front springs of an automobile, a fender, elastic longitudinally curved arms having their front ends secured to the upper side of the fender and their rear ends secured on the upper sides of the chassis side bars at points distant from the front ends of said chassis side bars, and lower supporting arms having their front ends pivotally connected to the lower side of the fender and their rear ends rigidly secured directly to the front axle.

In testimony whereof I affix my signature in presence of two witnesses.

JOHN SUMMERS.

Witnesses:
FRANK B. FISHER,
FRANK A. WILSON.

Copies of this patent may be obtained for five cents each, by addressing the "Commissioner of Patents, Washington, D. C."